US008843639B2

(12) United States Patent
Jewell

(10) Patent No.: US 8,843,639 B2
(45) Date of Patent: Sep. 23, 2014

(54) SYSTEM AND METHOD FOR CREATING A TRANSPARENT DATA TUNNEL

(75) Inventor: Timothy R. Jewell, Toronto (CA)

(73) Assignee: Acpana Business Systems Inc., Toronto (CA)

( * ) Notice: Subject to any disclaimer, the term of this patent is extended or adjusted under 35 U.S.C. 154(b) by 617 days.

(21) Appl. No.: 12/605,042

(22) Filed: Oct. 23, 2009

(65) Prior Publication Data

US 2011/0099619 A1 Apr. 28, 2011

(51) Int. Cl.

| | |
|---|---|
| ***G06F 15/16*** | (2006.01) |
| ***G06F 15/173*** | (2006.01) |
| ***H04L 12/46*** | (2006.01) |
| *H04L 29/12* | (2006.01) |
| *H04L 29/06* | (2006.01) |

(52) U.S. Cl.

CPC ............. *H04L 63/08* (2013.01); *H04L 61/2592* (2013.01); *H04L 12/4633* (2013.01); *H04L 63/029* (2013.01); *H04L 29/06625* (2013.01)

USPC .............................. 709/227; 709/238; 726/15

(58) Field of Classification Search

CPC ..................... H04L 12/4633; H04L 29/06625; H04L 61/2592; H04L 63/029; H04L 63/08

USPC ............... 709/227, 236, 238, 246; 726/11, 15

See application file for complete search history.

(56) References Cited

U.S. PATENT DOCUMENTS

| | | | | |
|---|---|---|---|---|
| 6,412,009 | B1 * | 6/2002 | Erickson et al. | 709/228 |
| 7,515,605 | B2 * | 4/2009 | Harel et al. | 370/466 |
| 2004/0133690 | A1 * | 7/2004 | Chauffour et al. | 709/229 |
| 2004/0264465 | A1 * | 12/2004 | Dunk | 370/392 |
| 2008/0075090 | A1 * | 3/2008 | Farricker et al. | 370/395.53 |
| 2010/0070634 | A1 * | 3/2010 | Ranjan et al. | 709/228 |

* cited by examiner

*Primary Examiner* — Brian J Gillis

(74) *Attorney, Agent, or Firm* — Bereskin & Parr LLP; Isis Caulder

(57) ABSTRACT

A method of transparently transferring data between a network application running on a first processor and a target service running on a second processor through a tunnel server running on a third processor, the method comprising: connecting a target program running on the second processor to the tunnel server; connecting a client program running on the first processor to the tunnel server; connecting the network application to the client program through a network adapter running on the first processor; sending data from network application to the tunnel server through the client program; connecting the target program to the target service through a network adapter running on the second processor; and relaying data from the tunnel server to the target service through the target program.

23 Claims, 9 Drawing Sheets

202

Connection database:

| User Id | Machine Id | Service |
|---|---|---|
| ... | | |
| Acpana Business Systems Inc. | jewell-DDBJEWELL | Remote Desktop |
| Acpana Business Systems Inc. | jewell-Home2255 | Remote Desktop |
| Acpana Business Systems Inc. | jewell-LOUISA | Remote Desktop |
| Acpana Business Systems Inc. | rschenkel-ROBWORK | Remote Desktop |
| Acpana Business Systems Inc. | rschenkel-RST7500 | Remote Desktop |
| ... | | |

Connection database:

| User Id | Machine Id | Service |
|---|---|---|
| ... | | |
| Acpana Business Systems Inc. | jewell-DDBJEWELL | Remote Desktop |
| Acpana Business Systems Inc. | jewell-Home2255 | Remote Desktop |
| Acpana Business Systems Inc. | jewell-LOUISA | Remote Desktop |
| Acpana Business Systems Inc. | rschenkel-laptop | Remote Desktop |
| Acpana Business Systems Inc. | rschenkel-laptop | Telnet |
| Acpana Business Systems Inc. | rschenkel-ROBWORK | Remote Desktop |
| Acpana Business Systems Inc. | rschenkel-RST7500 | Remote Desktop |
| ... | | |

SYSTEM AND METHOD FOR CREATING A TRANSPARENT DATA TUNNEL

FIELD

The embodiments described herein relate to computer network applications and in particular to a system and method for creating a transparent data tunnel.

BACKGROUND

Network applications running on computer systems between two computers (such as those providing remote desktop connectivity) are often difficult to set up. They require complex procedures or technical networking expertise to navigate the security safeguards (e.g. firewall) that are in place to prevent unauthorized access by hackers.

For example, a remote desktop connection client may have difficulty accessing the remote desktop services made available by another computer if the latter computer is behind a firewall. To allow access, the firewall (whether based on hardware or software) typically has to open up ports so as to pass through connection attempts to the computer offering the service.

Even solutions designed to provide secure communications between two computer systems over the public Internet such as Virtual Private Networks (VPNs) encounter the same problems of requiring firewall configuration before communication can freely occur. For example, a firewall may need to be configured to allow passthrough of Point-to-point Tunnel Protocol (PPTP) or Internet Protocol Security (IPSec) before a VPN may be established.

The requirement of firewall configuration creates several problems. First, it is challenging and troublesome for a person to use the services offered at a target computer (especially for one without technical expertise). Second, such configuration increases security risk by potentially providing an additional avenue for malicious hackers to compromise the computer offering the services.

SUMMARY

The embodiments described herein provide in one aspect, a method of transparently transferring data between a network application running on a first processor and a target service running on a second processor through a tunnel server running on a third processor, the method comprising:

a) connecting a target program running on the second processor to the tunnel server;
b) connecting a client program running on the first processor to the tunnel server;
c) connecting the network application to the client program through a network adapter running on the first processor;
d) sending data from network application to the tunnel server through the client program;
e) connecting the target program to the target service through a network adapter running on the second processor; and
f) relaying data from the tunnel server to the target service through the target program.

The embodiments described herein provide in another aspect, a) wrapping data received by the client program from the network application in a control protocol packet before sending it to the tunnel server; and
b) unwrapping data in the control protocol packet received by the target program from tunnel server before forwarding the data to the target service.

The embodiments described herein provide in another aspect, a) reading as much data as is available into the client program from the network application before wrapping the data in a control protocol packet;
b) reading the entire control protocol packet into the target program from the tunnel server before unwrapping the control protocol packet;
c) sending the entire control protocol packet to the tunnel server before continuing with reading; and
d) sending the entire payload of the control protocol packet to the target service before continuing with reading.

The embodiments described herein provide in another aspect where the network adapter running on the first processor is a loopback adapter.

The embodiments described herein provide in another aspect where the network adapter running on the second processor is a loopback adapter.

The embodiments described herein provide in another aspect where the tunnel server authenticates user information upon connection.

The embodiments described herein provide in another aspect where the data passes through an unconfigured firewall.

The embodiments described herein provide in another aspect where the data is not interrogated or cached.

The embodiments described herein provide in another aspect where the data travels over port 443.

The embodiments described herein provide in another aspect, a) sending response data from the target service to the tunnel server through the target program; and
b) forwarding response data from the tunnel server to the network application through the client program.

The embodiments described herein provide in another aspect, a system of transparently transferring data comprising a) a first processor running a network application and a client program configured to connect to each other through a network adapter running on the first processor;
b) a second processor running a target service and a target program configured to connect to each other through a network adapter running on the second processor; and
c) a third processor running a tunnel server configured to connect to the client program and the target program.

The embodiments described herein provide in another aspect, a system of transparently transferring data between a network application running on a first processor and a target service running on a second processor through a tunnel server running on a third processor, each processor executing instructions that perform the steps of the methods above.

The embodiments described herein provide in another aspect, a computer-readable storage medium comprising a plurality of instructions for execution on first, second and third processors, the instructions for performing the steps of the methods above.

Further aspects and advantages of the embodiments described herein will appear from the following description taken together with the accompanying drawings.

DRAWINGS

For a better understanding of the embodiments described herein and to show more clearly how they may be carried into effect, reference will now be made, by way of example only, to the accompanying drawings which show at least one exemplary embodiment, and in which:

FIG. 2B is a schematic diagram illustrating the contents in the connections database of the tunnel system before an initial connection by a target program in the system of FIG. 1B;

FIG. 2C is a schematic diagram illustrating the contents in the connections database of the tunnel server after an initial connection by a target program in the system of FIG. 1B;

Figure 1A:
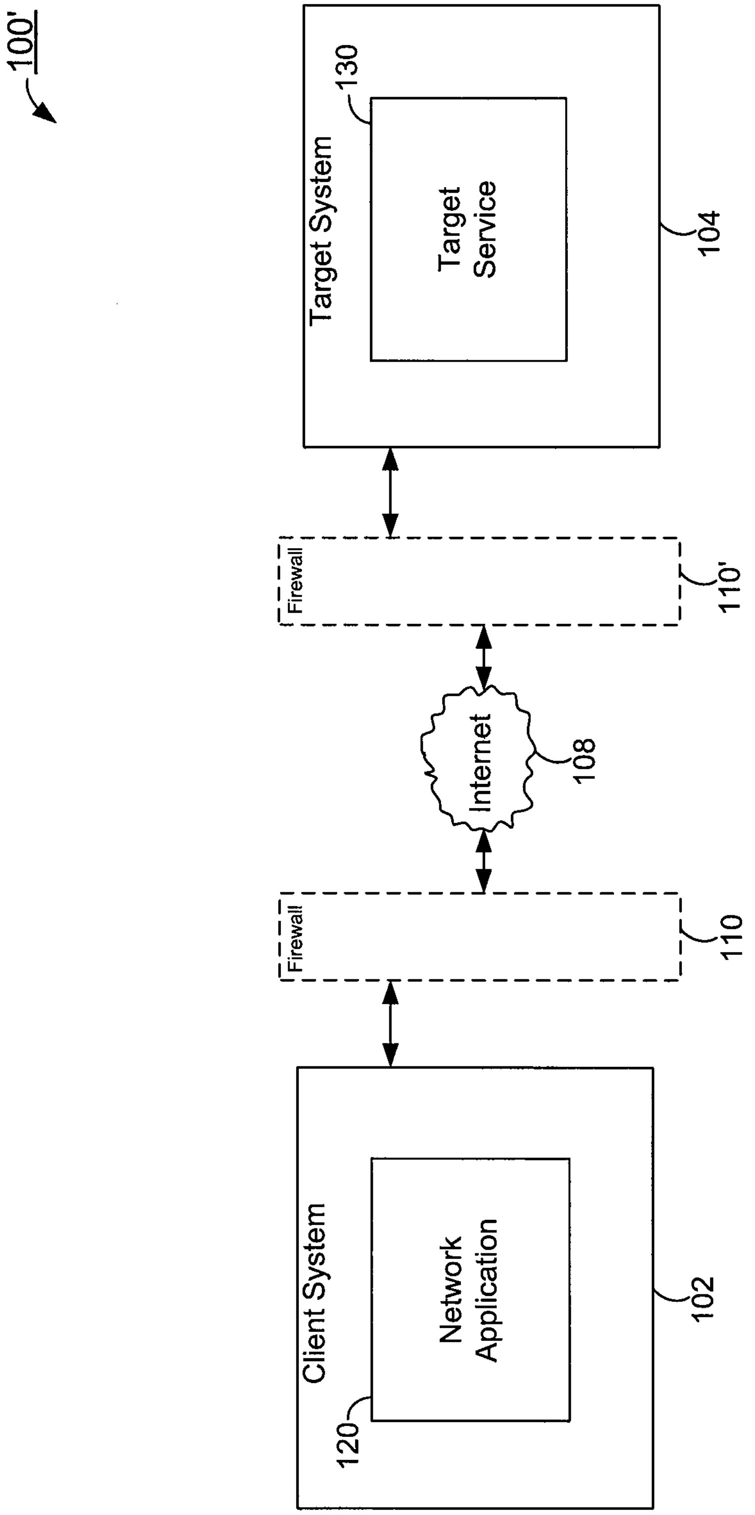
FIG. 1A is a block diagram of an example implementation of a system known in the prior art used to make a data connection between two software modules on computer systems connected via a network.
Figure 1B:
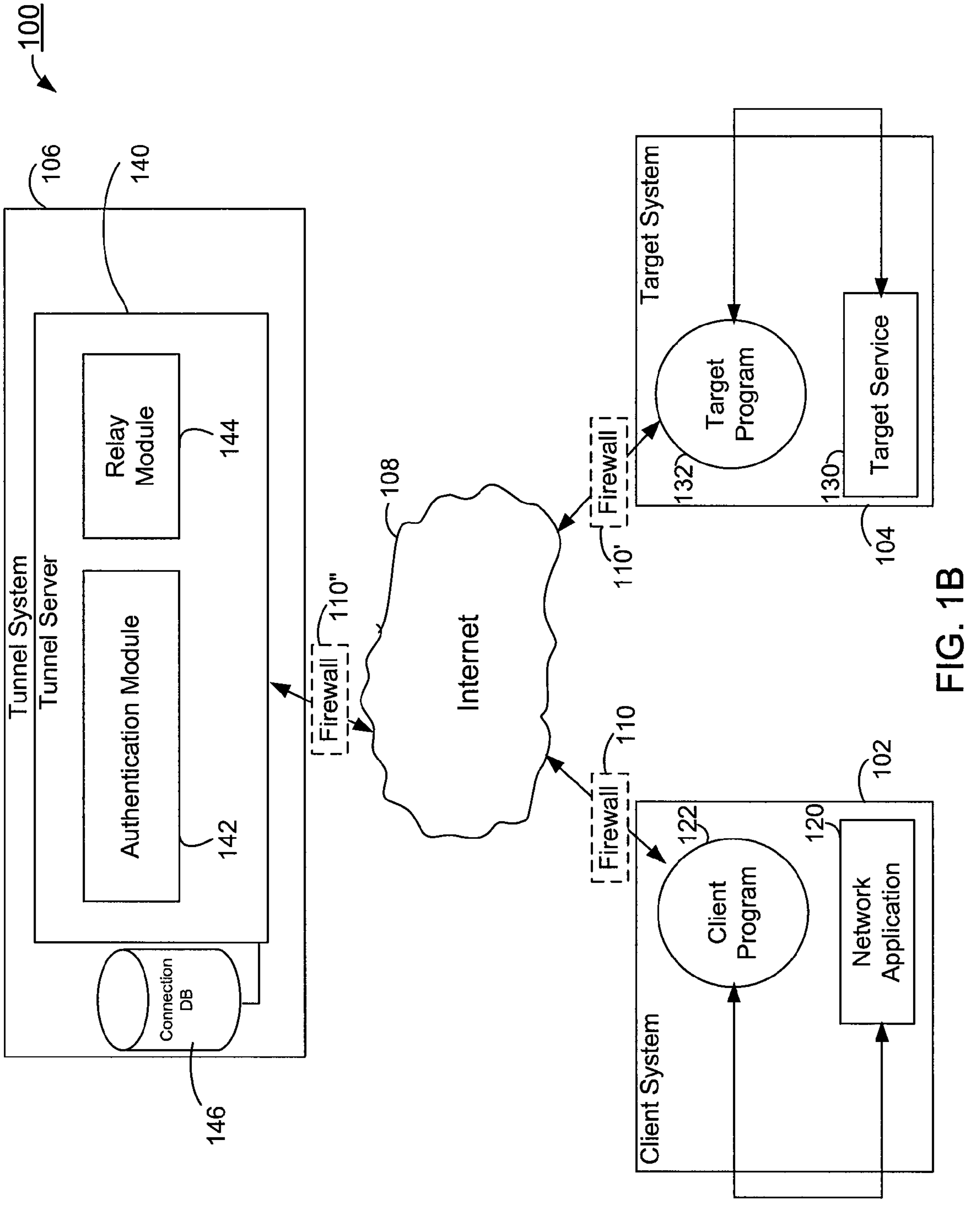
FIG. 1B is a block diagram of an example implementation of a system for creating a transparent data tunnel.
Figure 4:
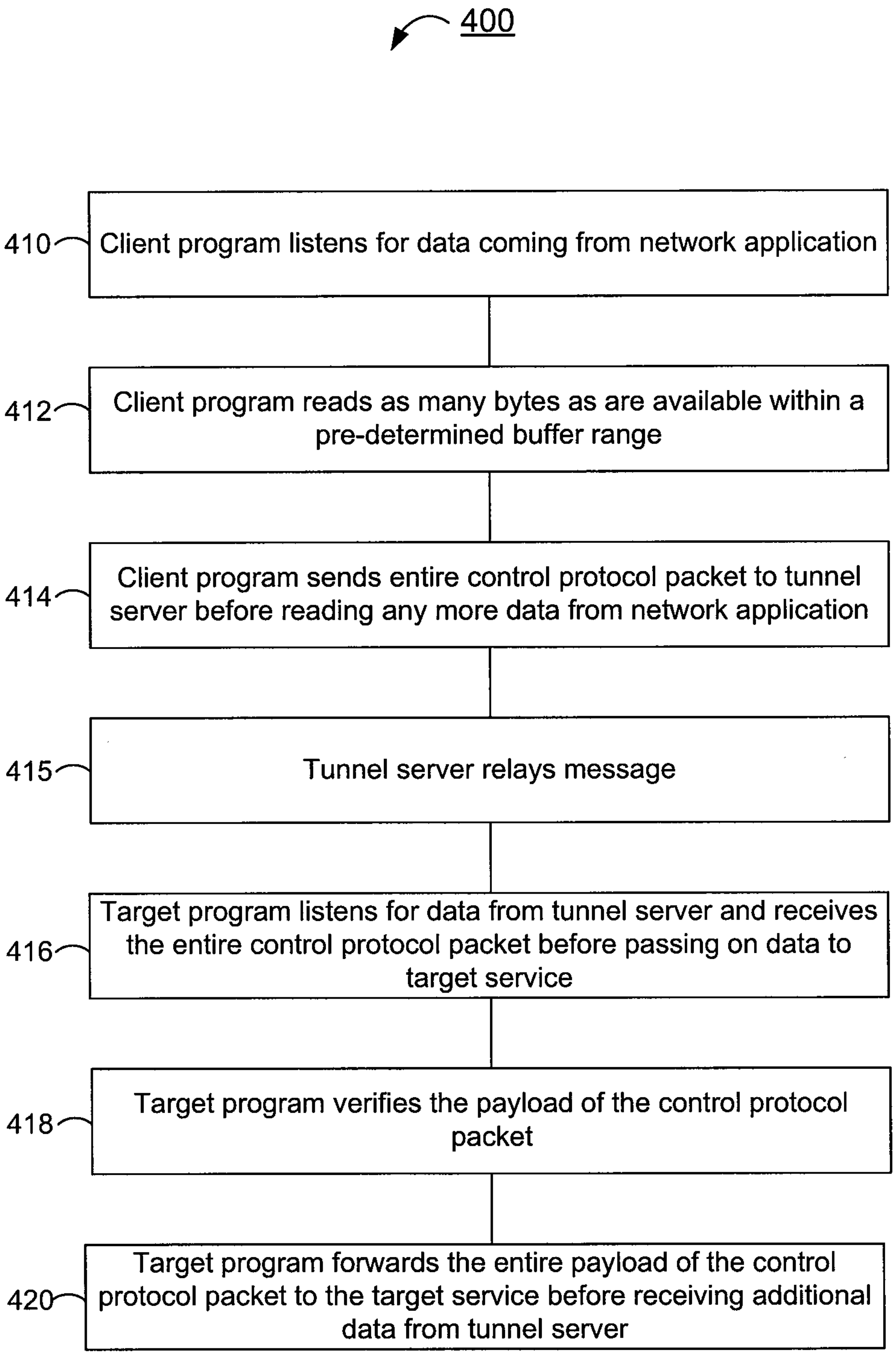
Figure 5:
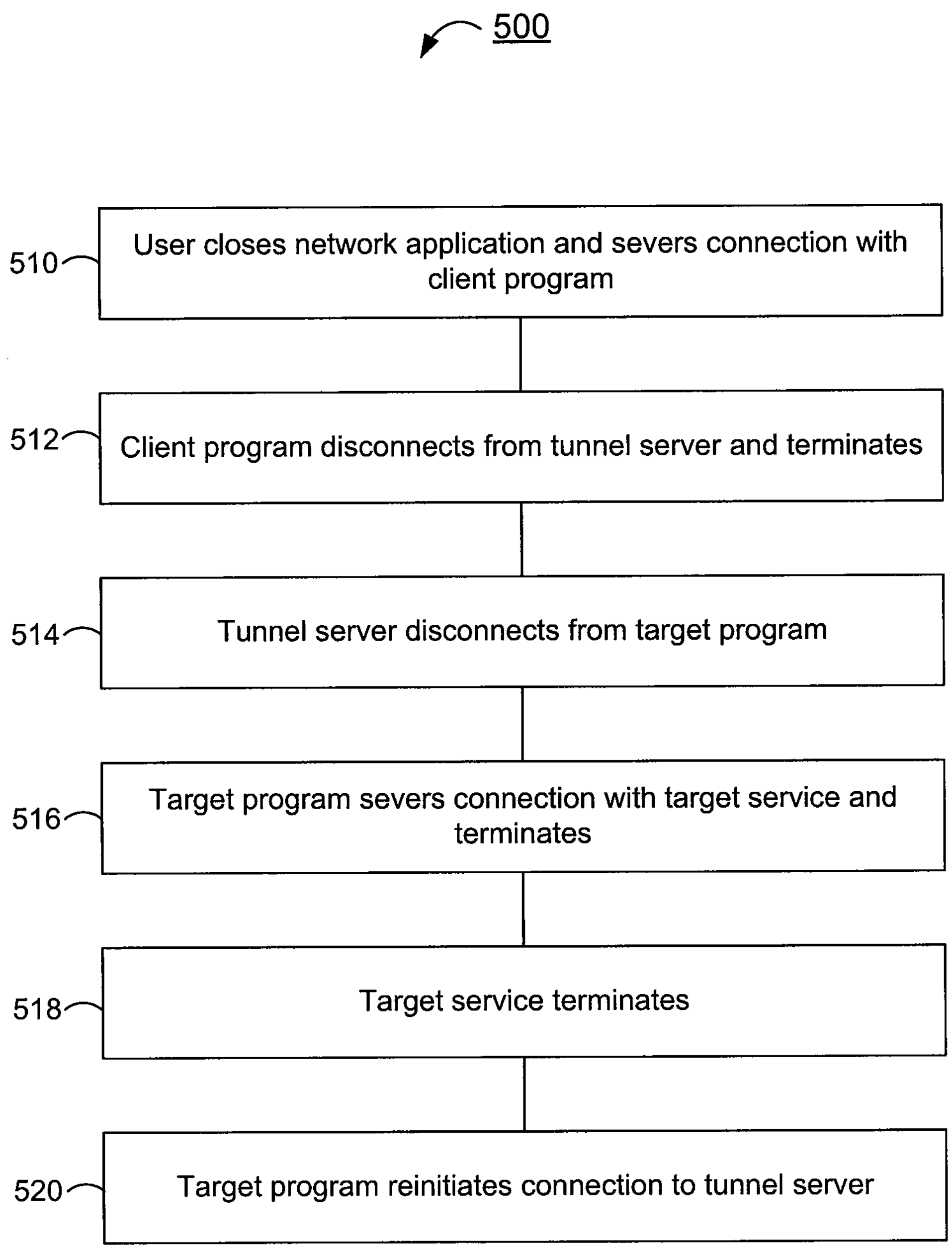

FIG. 4 is a flowchart illustrating the details of the control protocol used by client program, tunnel server and target program to relay data between network application and target service in the system of FIG. 1B; and FIG. 5 is a flowchart illustrating the process steps conducted by a client program, tunnel server and target program to terminate a transparent data tunnel between network application and target service in the system of FIG. 1B.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Referring to FIG. 1A, therein illustrated is a system for accessing target services across computer networks known in the prior art, shown generally as 100'. Network application 120 running on client system 102 attempts to access target service 130 on target system 104. Both client system 102 and target system 104 are members of separate computer networks connected by the Internet 108. The systems may be behind firewalls 110 and 110'. When network application 120 attempts to connect to target service 130 offered on target system 104, its connection attempt might be blocked by firewall 110' such that target service 130 does not receive the request for connection. Such events cause frustration for a user of client system 102. To enable access, the firewall 110' may be configured to allow the request for connection through. If there are additional target services 130 available on target system 104, firewall 110' may repeatedly need to be configured to allow access to such services—causing additional inconvenience for a user of target system 104.

For example, network applications such as Microsoft Remote Desktop Connection attempting to access target services such as Microsoft's Remote Desktop Services (formerly known as "Terminal Services") through firewalls may be blocked in their attempt to form a connection.

Now referring to FIG. 1B, a system for creating a transparent data tunnel between network application 120 and target service 130, shown generally as 100. As in system 100', client system 102 has installed network application 120 that attempts to access target service 130 offered on target system 104. Both systems are operatively connected to a communications network 108 (such as the Internet), but their access is safeguarded and restricted by firewalls 110 and 110'. Also, tunnel system 106 running tunnel server 140 is connected to the communications network 108 through its own firewall 110". Tunnel system 106 acts as an intermediary between the client system 102 and target system 104.

It should be understood that client system 102, target system 104 and tunnel system 106 may be implemented by any wired or wireless computing device with input and display means (e.g. conventional personal computer, laptop computing device, personal digital assistant (PDA), wireless communication device, cellular telephone, smartphone, etc.) These computing devices typically contain persistent memory (e.g. flash memory) storing software modules that may be loaded into volatile memory (e.g. Random Access Memory) for execution by physical processors on the respective computing devices. Network application 120, client program 122, target program 132, target service 130 and tunnel server 140 are examples of such modules. Further, these computing devices may include network connection means that allow them to connect to computer networks for communications with other computer systems. Such connection means may include wired (e.g. Ethernet connection) and wireless means (e.g. 802.11 Wireless Local Area Network (WLAN) or cellular standards).

Persons skilled in the art will appreciate that characteristics of a network connection may vary depending on the type of device performing the connection and the connection means. For example, a conventional personal computer connected by physical Ethernet likely has access to higher bandwidth and is less likely to drop its connection as compared with a smartphone connected by a cellular network. It will be understood that optimization of the control protocol (described below with reference to FIG. 4) for such specific network characteristics is within the contemplation of the exemplary embodiment.

Tunnel server 140 may contain two modules: authentication module 142 and relay module 144. As will be discussed below, authentication module 142 authenticates client and target systems connecting to tunnel server 140 and stores the various target services 130 available for connection in connection database 146. Also as discussed below, when a connection is established between client system 102 and target system 104, relay module 144 relays messages between the two systems.

In addition to network application 120, client system 102 may typically have client program 122 also installed. Client program 122 provides network application 120 an indirect route to communicate to communications network 108. Client program 122 receives messages sent from the network applications 120 and forwards the messages to tunnel server 140 through firewall 110 and communications network 108.

Corresponding to the two modules installed on client system 102, target system 104 may also have two software modules installed: target program 132 and target service 130. When messages destined for target service 130 are relayed from tunnel server 140 via communications network 108, they may be received by target program 132 through firewall 110'. Target program 132 then passes the original message sent by network application 120 to target service 130.

Although only one target system 104 is illustrated in FIG. 1B, it will be understood that there may be multiple target systems 104 connecting to tunnel system 106 to offer services that are accessible by client systems 102. It will be further understood that although only one network target service 130 is illustrated on target system 104, there may be multiple target services 130 offered on a target system 104. Similarly, there may be multiple network applications 120 running on one client system 102.

Moreover, as a person skilled in the art will understand that the geographical distance between tunnel system 106 and the client system 102 and the target system 104 affects the performance of the data tunnel because of latency, the preferred embodiment may provide additional instances of tunnel server 140 operating in diverse geographical locations. In such an embodiment, client and target systems will connect to the tunnel server 140 that is closest to their geographical location so as to minimize the impact of latency on the performance of the data tunnel.

In addition to creating latency between client system 102 and target system 104, the use of a data tunnel creates large bandwidth burdens on the tunnel server 140 due to duplication of the communication load between the client system 102 and target system 104. As monetary costs for bandwidth continue to decline, the costs of providing a transparent data tunnel that may need such duplication will be reduced.

Figure 2A:
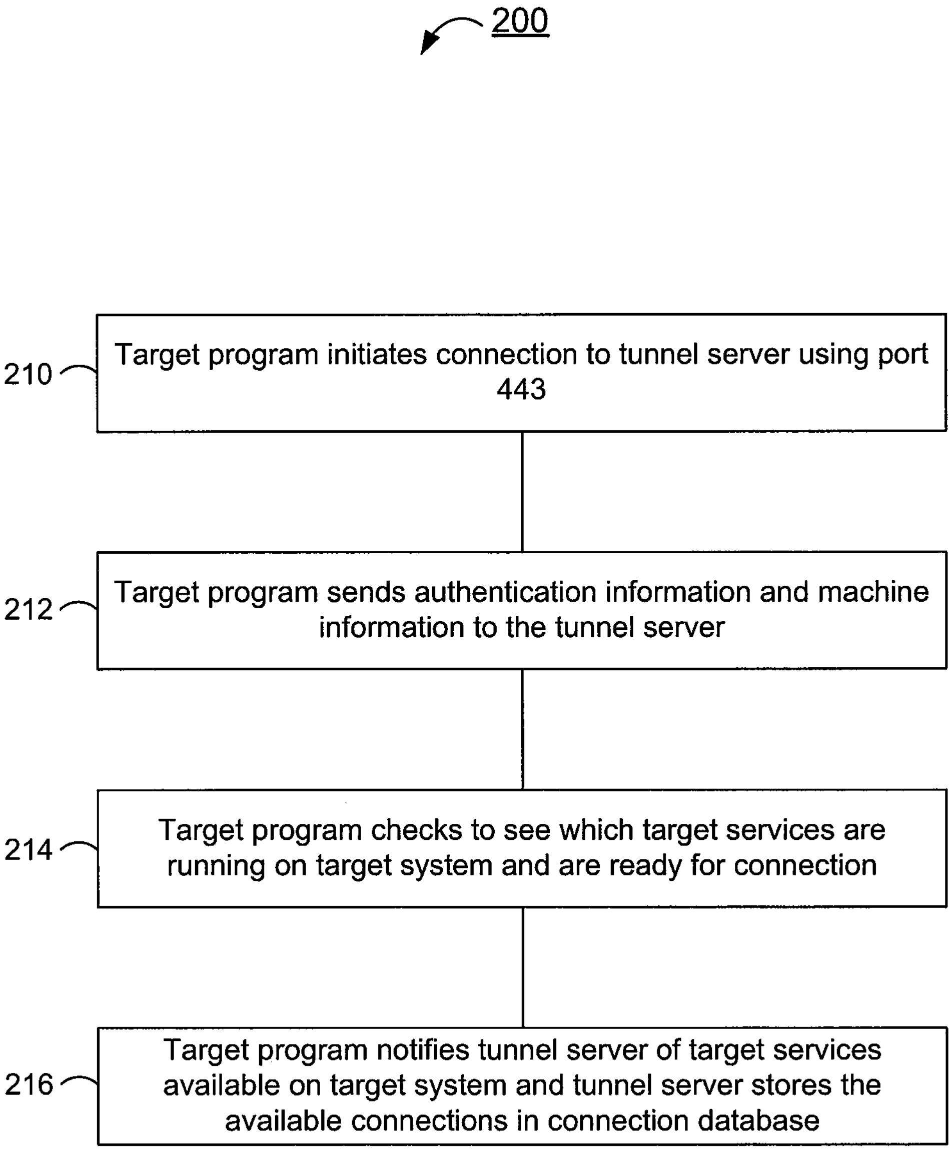
FIG. 2A is a flowchart illustrating the process steps conducted by target program initiating a connection to the tunnel server in the system of FIG. 1B.

Referring now to FIG. 2A, therein illustrated are the process steps 200 executed by the target program 132 when initiating a connection with tunnel server 140. At step (210), target program 132 initiates the connection to tunnel server 140 by connecting to tunnel system 106 on port number 443. The use of port 443 allows the connection to be made through most firewalls as port 443 is typically used for secure web browsing with hypertext transfer protocol over secure sockets layer or transport layer security (HTTPS), wherein the data sent and received is typically encrypted. Since data being communicated on this port is very common and is presumed to be secure because of encryption, firewalls typically do not block this port. Further, the presumption of encryption means there is typically also no interrogation of the data, nor caching of the content. Such configuration increases user convenience by allowing target services 130 to connect with outside computer systems without requiring the user to configure their firewall 110' for allowance.

Although port 443 is explicitly identified in the exemplary embodiment, the use of other ports offering the same described features is also within the contemplation of the exemplary embodiment. It will be understood that any references to port 443 below may be replaced with any suitable port number achieving the same effect of port 443.

At step (212), target program 132 sends authentication information to tunnel server 140 with user information identifying entities/individuals who can access target services 130 on target system 104 and machine information identifying the target system 104 that is available for connection. The use of a robust authentication system (e.g., transmitting authentication information under a highly secure encryption algorithm known in the art such as the Blowfish encryption algorithm) in establishing a connection between target program 132 and tunnel server 140 ensures that only authorized target systems 104 are permitted to advertise their target services 130. To that extent, the authenticity of the data transmitted between target system 104 and tunnel system 106 is ensured. If the authentication information is verified by authentication module 142, target program 132 is allowed to connect to tunnel server 140. It will be understood that although authentication module 142 is described as forming part of tunnel server 140 on tunnel system 106, authentication module 142 may be implemented as a software module residing on a separate computer system (not shown) operatively connected to communications network 108.

At step (214), target program 132 checks to see which target services 130 are running on target system 104 that are ready for connection. For such target services 130, target program 132 notifies tunnel server 140 of their availability, and tunnel server 140 stores such availability information in connection database 146 at step (216).

Referring to FIGS. 2B and 2C, therein illustrated are the contents of example records of connection database 146 before and after tunnel server 140 is notified of the target services 130 available on target system 104, shown generally as 202 and 202' respectively.

FIG. 2B illustrates example records 240 containing exemplary fields "User Id" identifying the users able to access the target system 104, "Machine Id" identifying the target system 104 and "Service" identifying the target service 130 available for connection by client system 102. FIG. 2C illustrates the additional records 240' added to the connection database 146 after the target program 132 of target system "rschenkel-laptop" notifies tunnel server 140 of the availability of its "Remote Desktop" and "Telnet" target services. It will be understood that additional fields and tables (not shown) may be stored in connection database 146. For example, an additional field may store the status (e.g. "in use", "available", etc.) of a target service 130 on a given target system 104.

As will be understood, there may be multiple target systems 104 repeating this process with tunnel server 140, so as to advertise the availability of target services 130 to client system 102.

Figure 2D:
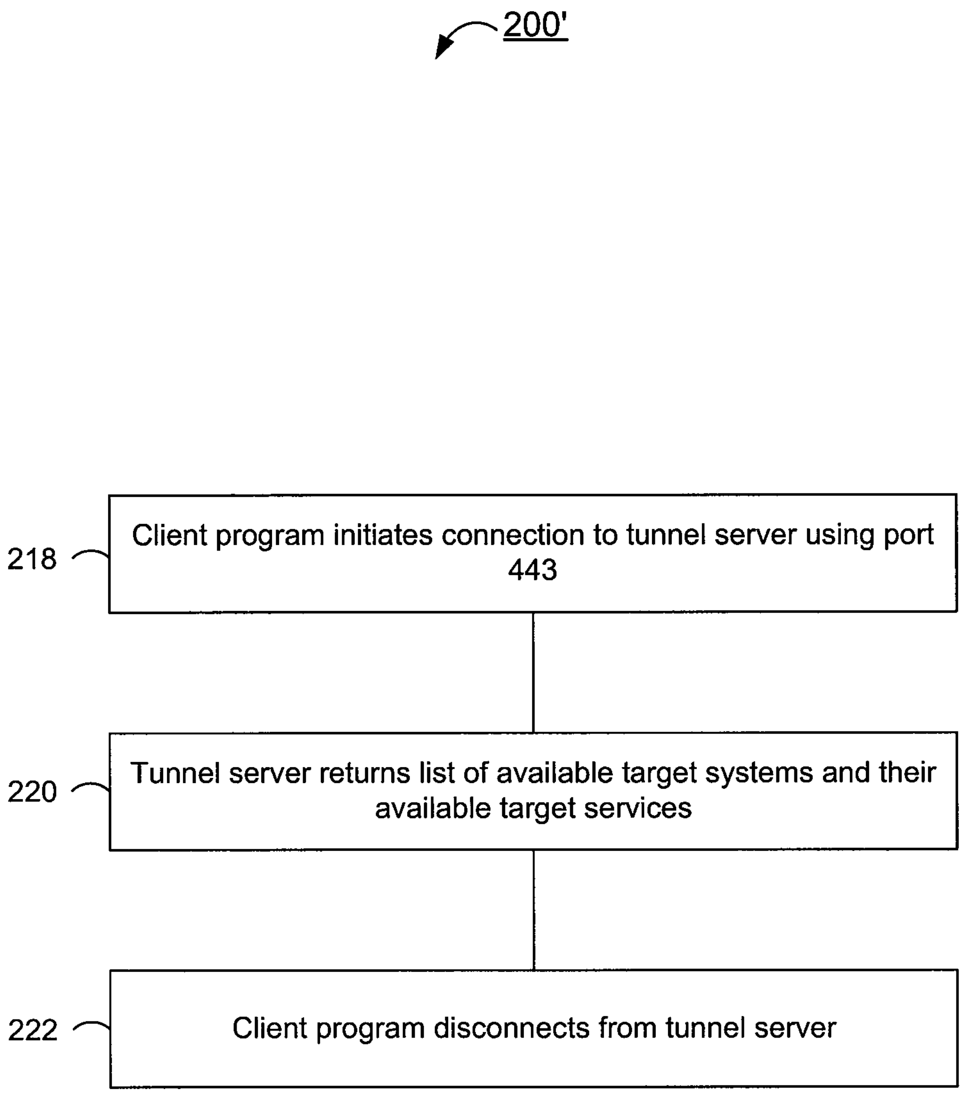
FIG. 2D is a flowchart illustrating the process steps conducted by a client program initiating a connection to the tunnel server in the system of FIG. 1B.

Referring to FIG. 2D, therein illustrated are the process steps 200' executed by the client program 122 when initiating a connection to the tunnel server 140. As previously discussed, client program 122 may also similarly perform its initial connection to tunnel server 140 by connecting to tunnel system 106 on port 443 step (218), passing in authentication information. If authentication module 142 verifies the authentication information, client program 122 is allowed to connect to tunnel server 140. Client program 122 connects on port 443 and uses the same authentication system to connect with tunnel server 140 for the same reasons as target program 132 (discussed above).

In response to a connection attempt by client program 122, tunnel server 140 returns a list of available target systems 104 and their available target services 130 that are available for connections by network applications 120 installed on client system 102 at step (220). Upon receiving such information, client program 122 disconnects from the tunnel server 140 at step (222). In a preferred embodiment, the list returned by tunnel server 140 may be further organized (e.g. only indicating target systems 104 with a specific type of target service 130 (e.g. Remote Desktop Services)).

It may be the case that there is a delay between the initial advertisement of target services 130 to tunnel server 140 and the connection attempt by client program 122 to tunnel server 140. As such, when returning the list of available target systems to client program 122, such information may potentially be outdated.

One exemplary embodiment addresses such deficiency by having target program 132 echo the availability of its target services 130 to tunnel server 140 at a regular time interval (e.g., every 5 minutes). The tunnel server 140, in response, maintains the state information of connected target systems 104. As discussed above, status information may be stored in connection database 146. The state information references the last activity received from target system 104, and if no messages have been received from a target program 132 within the time interval, the target system 104 is removed from the list of available target systems 104 for connection stored in the connection database 146. As such, when client program 122 attempts to connect to tunnel server 140 to retrieve the list of available target systems 104, the list returned will be up to date to within a minor time variation.

Figure 2E:
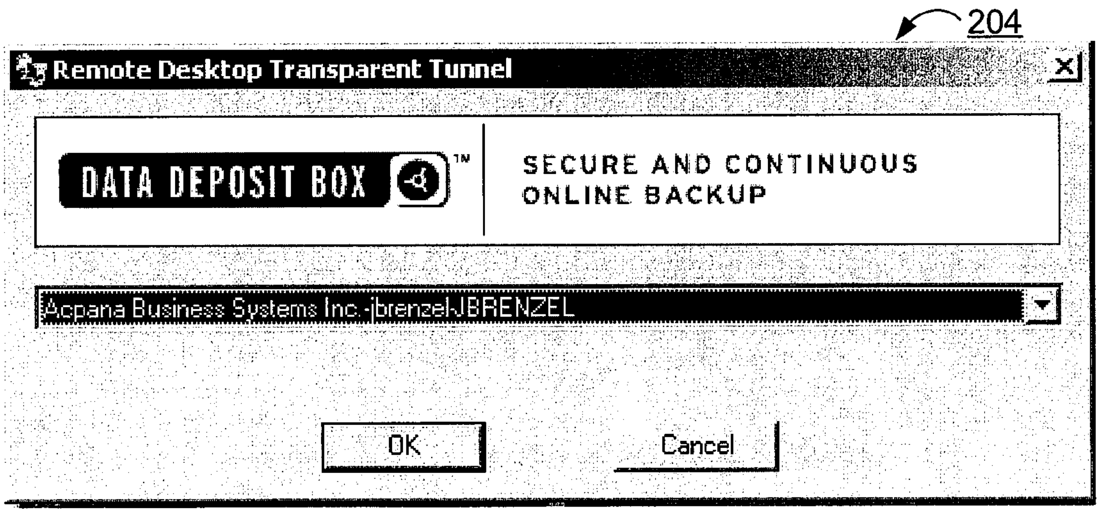
FIGS. 2E and 2F are screen capture representations of a graphical user interface (GUI) generated by the client program of FIG. 1B indicating the target systems offering target services available for connection in the system of FIG. 1B.
Figure 2F:
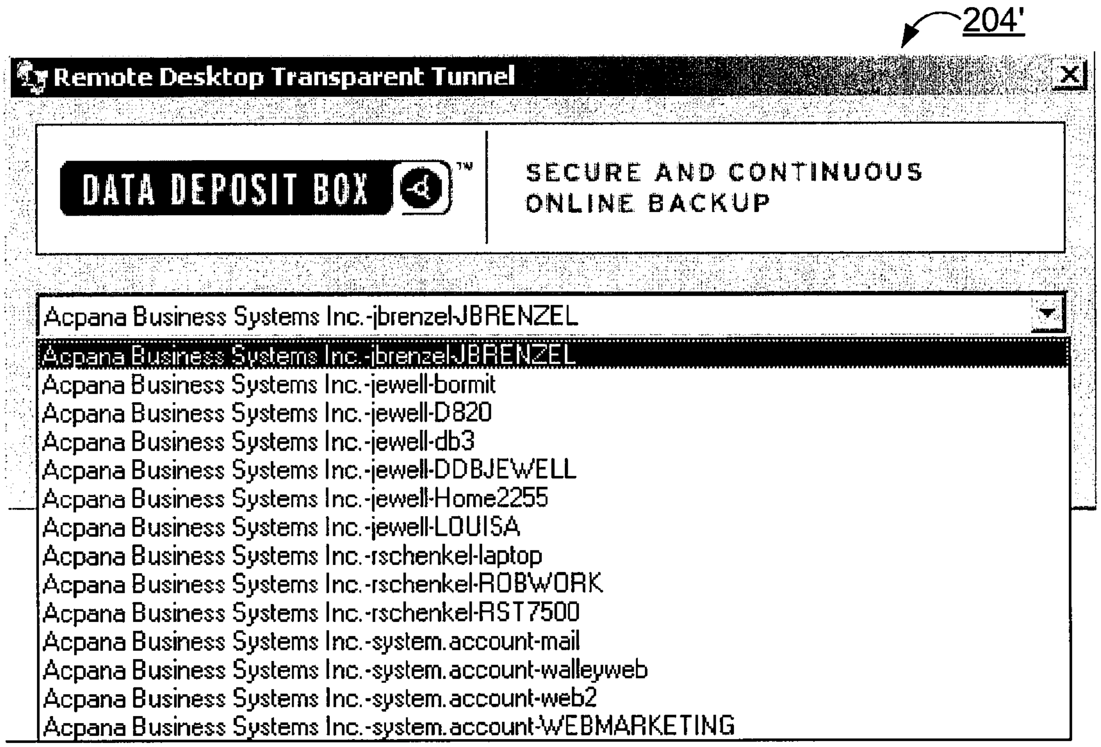

Referring to FIGS. 2E and 2F, therein illustrated are example screen captures of a graphical user interface (GUI) generated by the client program 122, shown generally as 204 and 204' respectively. In the exemplary embodiment, the application of FIG. 2E has been configured to only display "Remote Desktop" target services. FIG. 2F illustrates the expanded drop-down box containing the list of target systems 104 that client system 102 can open a remote desktop connection to.

Figure 3:
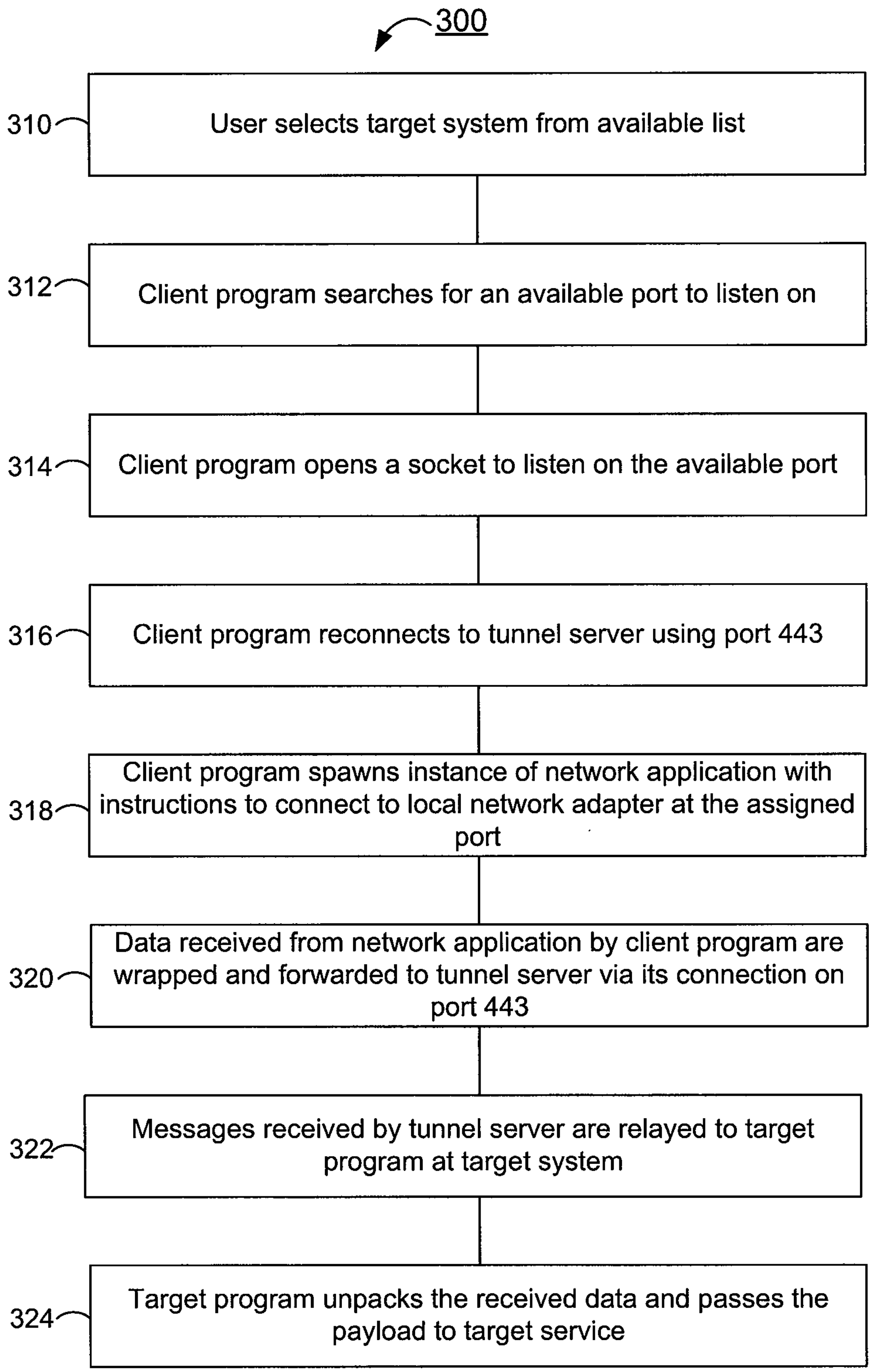
FIG. 3 is a flowchart illustrating the process steps conducted by a client program, tunnel server and target program to establish a data tunnel between network application and target service in the system of FIG. 1B.

Referring now to FIG. 3, therein illustrated in greater detail are process steps 300 which are executed when establishing the data tunnel between network application 120 to target service 130 using the connection established between client program 122 and target program 132 through tunnel server 140.

The process is initiated by a user of client system 102 selecting a target system 104 to connect to from the list of available target systems 104 returned from tunnel server 140 at step 220 of FIG. 2D step (310). The client program 132 then searches for available ports to listen on client system 102 at step (312). Once an available port is found, client program 132 opens a socket to listen on the available port at step (314). The client then reestablishes its connection to tunnel server using port 443 at step (316), with a request to relay information to the tunnel server 140. The request contains user authentication and target system 104 identification information.

In alternate embodiments, client program 122 may maintain its connection to tunnel server 140 such that it need not reestablish a connection upon the user selecting a target system 104. However, such disconnection and reconnection alleviates tunnel server 140 from having to process messages to maintain the connection if there is a long period of time between a user's retrieval of the list of available target systems 104 and the user's selection of a target system 104 to connect with. Such reduction of messages may reduce the workload of tunnel server 140, thereby making it more responsive. Nevertheless, if the user selects a target system 104 that is no longer available for connection, an error is returned from tunnel server 140 and its unavailability is indicated to client program 122.

Client program 122 then spawns an instance of network application 120 with instructions to connect to the local network adapter (i.e., the loopback adapter with IP address of 127.0.0.1 or the IP address identifying client system 102) on the port opened (during step (314)) at step (318). Network application 120 now begins to communicate using the established connection and the indicated port.

At step (320), messages received by client program 122 are wrapped in a control protocol packet (discussed below) and forwarded to tunnel server 140 via its reestablished connection on port 443. The tunnel server 140 subsequently relays the control protocol packet to the target program 132 of the specified target system 104 at step (322). Upon receipt of the control protocol packet by target program 132, the payload is unpacked and forwarded to the target service 130 on the port the target service 130 is configured to listen to at step (324). For example, Microsoft Remote Desktop Services is typically configured to listen on port 3389. It will be understood that the port target service 130 listens on may also be user-configurable (e.g. through a configuration file) depending on the target service 130. As discussed above at step (212) of FIG. 2A, target service 130 has already been verified to be running by target program 132 before target program's 132 initial connection was made to tunnel server 140.

In alternate embodiments, network application 120 may be configured to connect to target services 130 listening on more than one port. In such embodiments, client program 122 may be configured to listen on multiple ports to mimic the listening behavior of the desired target service 130. The received data will then be relayed through tunnel server 140 to an appropriately configured target program 132 able to determine disassemble the data and forward the messages to the corresponding ports that target service 130 listens on.

Referring now to FIG. 4, therein described in greater detail is the control protocol performing the wrapping and forwarding of messages (step (320) of FIG. 3) performed by client program 122 and target program 132, shown generally as 400. (The steps of FIG. 4 are described in the context of network application 120 sending messages to target service 130, but it should be understood that this description is also applicable for the mirror image of sending response data in the reverse direction.)

At step (410), client program 122 listens for data from network application 120. When data arrives, client program 122 reads in as many bytes as are available, up to a predetermined buffer range (412). When the buffer range is full or when there is no more data, the read data is wrapped by a control protocol packet and sent to tunnel server 140. In the preferred embodiment, client program 122 does not pause to fill the entire length of the buffer with data from network application 120. Instead, it sends the read data to tunnel server 140 as soon as no more bytes can be read from network application 120. Such immediate sending may provide optimal performance and responsiveness in using a transparent data tunnel, especially for network applications 120 and target services 130 employing time-sensitive communication protocols. Nevertheless, it should be understood that instead, it is within the contemplation of the exemplary embodiment for a client program 122 to be configured to wait for a buffer to be completely filled with read data from network application 120.

The control protocol packet header may include the length of the data contained in the control protocol packet and a cyclic redundancy check (CRC) to ensure the data is being received at the destination without any errors.

While sending data from client program 122 to tunnel server 140, the entirety of a control protocol packet is sent before reading any more data from network application 120 at step (414). In the preferred embodiment, the length of the buffer is 64K. Such size ensures that if there are large amounts of data being sent by network application 120, the data sent is not so segmented that data arrives at the target service 130 in a choppy way. It will be understood by those skilled in the art that buffer lengths of different sizes are within the contemplation of the exemplary embodiment, and may be specifically configured for optimal performance of specific network applications 120 and target services 130.

It may be possible that in the context of reading as much data as possible, there is more data in the message then the fixed-length buffer can accommodate. The control protocol may handle such a situation by having control program 122 send the extra bytes in a later packet to tunnel server 140. The control protocol packet header may thus include an additional length field to keep track of the length of the original message received from network application 120 such that when the segmented data arrives at the target program 132, the entire original message of network application 120 can be reassembled and forwarded to target service 130.

It will be further understood that the exemplary embodiment contemplates the use of dynamically allocated and released buffers for the storing of messages before relaying. However, the preferred embodiment uses a fixed buffer length for reading and sending message data to increase performance by reducing the allocation of new memory as that is a computationally expensive operation.

Moreover, alternate embodiments may configure the protocol to operate in alternate ways (e.g., using multiple threads to coordinate reading and sending of data using multiple buffers, etc.) As such, different techniques known to persons skilled in the art used to improve the performance of the protocol to relay data are within the contemplation of the exemplary embodiment.

Upon receipt of the data at tunnel system 106, relay module 144 of tunnel server 140 relays the data to target program 132 at step (415).

Target program 132 listens for data from tunnel server 140 and if data is available, the entire control protocol packet is read before any of the data is passed onto target service 130 at step (416). As noted, the control packet header may indicate the expected length and CRC of the packet. Once the reading is accomplished, the message is verified and sent to the target service 130 at step (418). In the current embodiment, verification is performed by analysis of the CRC in the protocol packet header. However, in alternate embodiments, verification may be accomplished through other means such as a checksum or character-by-character parity bit checking.

In further alternate embodiments, client program 122 may be configured to augment the data received from network application 120 (for example, by adding encryption) to enhance the functionality of the protocol used by network application 120 and target service 130. In such embodiments, the additional steps of the protocol (e.g., encryption) would be performed at client program 122 before the control protocol packet is sent, and the corresponding step (e.g. decryption) will be performed at the target program 132 after the entire control protocol packet is received.

If the payload of the control protocol packet forms a partial message of what was originally sent by network application 120, target program may be configured to read only the bytes that form the remainder of the original message so as to be able to reassemble the original message. Once the entire original message has arrived, target program 132 then forwards the unwrapped message to target service 130 using the local network adapter (i.e., the loopback adapter with IP address of 127.0.0.1 or the IP address identifying target system 104) on the port the target service 130 is expecting a connection on (e.g. Microsoft Remote Desktop Services typically expects connections on port 3389 (as noted above), and Telnet typically expects connections on port 23). The entire message is sent to the target service 130 before target program 132 continues receiving further data from tunnel server 140 at step (420).

In the described embodiment, relay module 144 of tunnel server 140 processes the control protocol in the same way as client program 122 and target program 132, that is, it reads entire packets of data from client program 122 and verifies them against the CRC before forwarding them onto the target program 132. In alternate embodiments, processing of the control protocol packet by relay module 144 may be reduced so as to simply forward whatever data is received without accumulating or verifying data. Such embodiments may increase complexity in the processing of the protocol by having variations in how the protocol is handled on different systems, but may result in higher performance and throughput at tunnel server 140.

As noted above, while the steps of FIG. 4 illustrate the details of the control protocol with messages emanating from network application 120 destined for target service 130, such steps may be mirrored for the response data sent from target service 130 to network application 120. Specifically, target program 132 may read as much data from target service 130 as possible into a specific buffer range steps (410) and (412). Target program 132 then wraps the data using the control protocol and sends the entire control protocol packet to tunnel server 140 before reading more data from target service 130 at step (414). Tunnel server 140 forwards the packet to client program 122 at step (415), which reads in the entire control protocol packet based on the length of the packet specified in the control protocol packet header. After the entire control protocol packet is received at step (416), client program 122 verifies the integrity of the received data using the CRC at step (418) and sends the payload to network application 120 using the local network adapter (i.e., the loopback adapter with IP address of 127.0.0.1 or the IP address identifying client system 102). The entire payload of the control protocol packet must be sent to network application 120 before additional data is received from tunnel server 140 at step (420).

Referring to FIG. 5, therein illustrated are the process steps, shown generally as 500, of terminating a transparent data tunnel between network application 120 and target service 130. At step (500) (510), a user closes network application 120 and severs its connection with client program 122. Client program 122 may then disconnect from tunnel server 104 and may terminate (512).

Sensing one side of a data tunnel has been terminated, tunnel server 104 may disconnect from target program 132 (514).

At step (516), target program severs its connection with target service and may terminate. Sensing termination of the target program, target service may also terminate (518). It will be understood that depending on the target service 130, it may not terminate and may just acknowledge the disconnection of a user and maintain its availability for future connections.

At step (520), target program may automatically reinitialize its connection to tunnel server after a period of time to advertise the availability of running target services (as described in respect of FIG. 2A).

In the present embodiment, upon closing of network application 120, the entire data tunnel may be torn down. It will be understood by those skilled in the art that although such configuration may cause delay in reestablishing the connection at a later time, computing resources may be freed up in the interim. Moreover, it provides client and target programs the opportunity to perform any resource cleanup that may be required. In alternate embodiments, however, if a user repeatedly utilizes a specific network application 120 with a specific target service 130, a persistent connection between client program 122 and target program 132 may be maintained so as to speed up the reestablishment of the connection.

It will be appreciated that while the subject system and method for creating a transparent data tunnel has been described in the context of remote desktop connection in order to provide an application-specific illustration, it should be understood that the subject system and method for creating a transparent data tunnel could also be applied to any other type of network application using a target service.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method of transparently sending data between a network application running on a first processor and a target service running on a second processor through a tunnel server running on a third processor, the method comprising:

a) connecting a target program running on the second processor to the tunnel server;

b) connecting a client program running on the first processor to the tunnel server;

c) connecting the network application to the client program through a selected port on a network adapter, the network adapter running on the first processor;

d) sending data from the network application to the tunnel server through the client program, wherein the network application sends the data to the client program on the selected port;

e) connecting the target program to the target service through a network adapter running on the second processor; and f) relaying data from the tunnel server to the target service through the target program.

2. The method of claim 1, further comprising:

a) wrapping data received by the client program from the network application in a control protocol packet before sending it to the tunnel server; and b) unwrapping data in the control protocol packet received by the target program from tunnel server before forwarding the data to the target service.

3. The method of claim 2, further comprising:

a) reading as much data as is available into the client program from the network application before wrapping the data in a control protocol packet; and b) sending the control protocol packet to the target service in entirety before continuing with reading.

4. The method of claim 2, further comprising:

a) sending the control protocol packet in entirety to the tunnel server before continuing with reading; and b) reading the control protocol packet in entirety into the target program from the tunnel server before unwrapping the control protocol packet.

5. The method of claim 1 wherein the network adapter running on the first processor is a loopback adapter.

6. The method of claim 1 wherein the network adapter running on the second processor is a loopback adapter.

7. The method of claim 1 wherein the tunnel server authenticates user information upon connection.

8. The method of claim 1 wherein the data passes through an unconfigured firewall.

9. The method of claim 8 wherein the data is not interrogated or cached.

10. The method of claim 8 wherein the data travels over port 443.

11. The method of claim 1, further comprising:

a) sending response data from the target service to the tunnel server through the target program; and b) forwarding response data from the tunnel server to the network application through the client program.

12. A system of transparently transferring data comprising:

a) a first processor running a network application and a client program configured to connect to each other through a selected port on a network adapter, the network adapter running on the first processor;

b) a second processor running a target service and a target program configured to connect to each other through a network adapter running on the second processor;

c) a third processor running a tunnel server configured to connect to the client program and the target program such that data can be sent between the network application to the target server;

d) send data from the network application to the tunnel server through the client program, wherein the network application sends the data to the client program on the selected port; and e) relay data from the tunnel server to the target service through the target program.

13. The system of claim 12, further configured to:

a) wrap data received by the client program from the network application in a control protocol packet before sending it to the tunnel server; and b) unwrap data in the control protocol packet received by the target program from tunnel server before forwarding the data to the target service.

14. The system of claim 13, further configured to:

a) read as much data as is available into the client program from the network application before wrapping the data in a control protocol packet; and b) send the control protocol packet to the target service in entirety before continuing with reading.

15. The system of claim 13, further configured to:

a) send the control protocol packet in entirety to the tunnel server before continuing with reading; and b) read the control protocol packet in entirety into the target program from the tunnel server before unwrapping the control protocol packet.

16. The system of claim 12, wherein the network adapter running on the first processor is a loopback adapter.

17. The system of claim 12, wherein the network adapter running on the second processor is a loopback adapter.

18. The system of claim 12, wherein the tunnel server authenticates user information upon connection.

19. The system of claim 12, wherein the data passes through an unconfigured firewall.

20. The system of claim 19, wherein the data is not interrogated or cached.

21. The system of claim 19, wherein the data travels over port 443.

22. The system of claim 12, further configured to:

a) send response data from the target service to the tunnel server through the target program; and b) forward response data from the tunnel server to the network application through the client program.

23. A physical non-transitory computer-readable medium comprising instructions for sending data transparently between a network application running on a first processor and a target service running on a second processor through a tunnel server running on a third processor, the instructions comprising:

a) connecting a target program running on the second processor to the tunnel server;

b) connecting a client program running on the first processor to the tunnel server;

c) connecting the network application to the client program through a selected port on a network adapter, the network adapter running on the first processor;

d) sending data from the network application to the tunnel server through the client program, wherein the network application sends the data to the client program on the selected port;

e) connecting the target program to the target service through a network adapter running on the second processor; and f) relaying data from the tunnel server to the target service through the target program.

* * * * *